Feb. 22, 1966    S. R. STARNAMAN    3,236,169
AUTOMOBILE AIR VENTING SYSTEM
Filed July 1, 1963
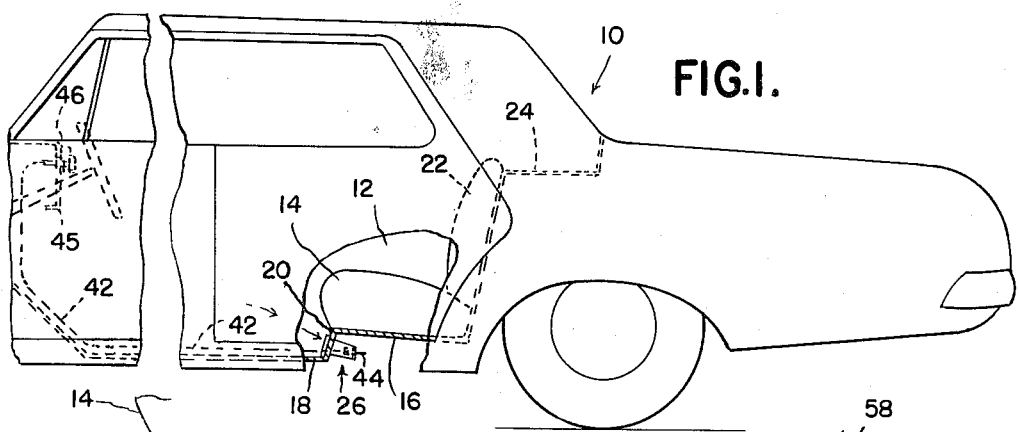
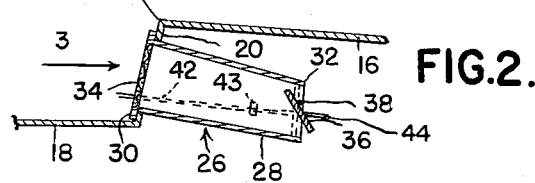
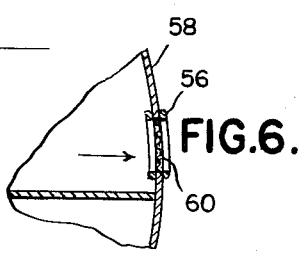
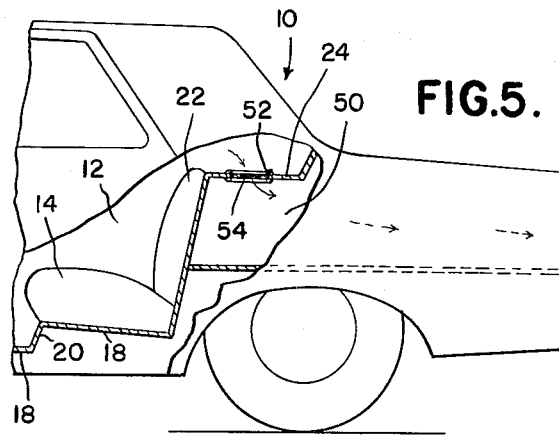
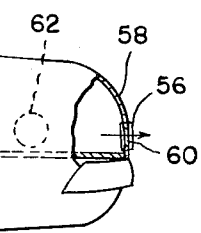
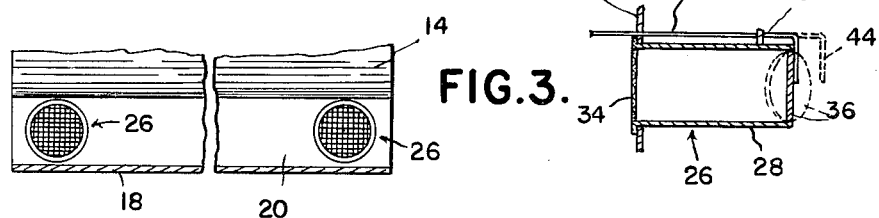
INVENTOR.
SAMUEL R. STARNAMAN
BY
ATTORNEYS

United States Patent Office 3,236,169
Patented Feb. 22, 1966

3,236,169
AUTOMOBILE AIR VENTING SYSTEM
Samuel R. Starnaman, 4580 Pickering Road,
Birmingham, Mich.
Filed July 1, 1963, Ser. No. 291,731
2 Claims. (Cl. 98—2)

This invention relates generally to a system for controlling the movement and pressure of air in the passenger compartment of a vehicle and refers more particularly to a system for withdrawing air from the passenger compartment of a motor vehicle.

One of the essential objects of this invention is to provide a system for controlling the pressure and movement of air within the passenger space of a motor vehicle which will provide improved heating or cooling efficiency and in general provide increased comfort for the passengers.

Another object of the invention is to provide means for effecting a flow of air out of the passenger space of an automobile.

Another object is to provide vents for the flow of air located at the rear of the passenger space.

Another object is to provide means for preventing the reverse flow of air through the outlets into the passenger space.

Another object is to provide for the controlled evacuation of air from the passenger compartment of a vehicle in a manner which will increase the efficiency of conventional heating and air conditioning equipment so that lower capacity equipment may be employed.

Another object is to provide a means for enabling the passenger space of a vehicle to be heated or cooled much more rapidly.

Another object is to provide a means for assuring the presence at all times within the passenger space of clean fresh air free of smoke and other obnoxious odors.

Another object is to provide a ventilating system which will obviate the necessity of opening windows for ventilation.

Another object is to provide a system which will make under seat heating unnecessary.

Another object is to control the air pressure within the passenger space to reduce wind noise.

Other objects and feaures of the invention will become apparent as the description proceeds, especially when taken in conjunction with the accompanying drawings, wherein:

FIGURE 1 is a fragmentary side elevational view of a portion of an automobile, with parts in section, showing a preferred embodiment of my invention.

FIGURE 2 is an enlarged fragmentary sectional view of a portion of the structure shown in FIGURE 1.

FIGURE 3 is a fragmentary elevation looking in the direction of the arrow 3 in FIGURE 2.

FIGURE 4 is a section of part of the structure in FIGURE 2.

FIGURE 5 is similar to FIGURE 1 but shows a modification.

FIGURE 6 is an enlarged fragmentary section of a portion of FIGURE 5.

Referring now more particularly to the drawing and especially to FIGURES 1–4, the reference character 10 indicates a motor vehicle equipped with the ventilating system of my invention. The vehicle 10 has a closed body defining a passenger space 12. The rear seat 14 is mounted on the panel 16 which is connected to the floor panel 18 by a generally upright panel 20. Associated with the rear seat structure is a back rest 22, and at the rear of the back rest, at the top, is a generally horizontal package shelf 24. The passenger compartment is substantially a closed space when the doors of the vehicle are closed.

A pair of identical ducts 26 are provided in the generally upright panel 20 and serve as a means for withdrawing air from the passenger space. The ducts are located near opposite sides of the panel 20 and each is in the form of a tube 28 which extends through an opening in the panel 20. The flange 30 surrounding one end of the tube abuts against the panel 20 within the passenger compartment and the remainder of the tube is exterior with respect to the closed body passenger space, and opens at its outlet end 32 into the ambient air beneath the vehicle. The flange 30 may be secured, either removably or permanently, to the generally upright panel 20 in any suitable manner. It will be noted that the tube 28 is generally frusto-conical, being large at its flanged or inlet end and relatively smaller at its outlet end 32. A screen 34 covers the flanged inlet end of the tube.

A circular imperforate valve plate 36 extends across the outlet end 32 of the tube 28. The valve plate 36 is hinged on a pin 38 which is horizontal and is secured at its ends to opposite side walls of the tube. The pin 38 is secured to one face of the valve plate above the center of gravity of the valve plate so that normally the valve plate tends to swing to a more or less vertical position shown in dotted lines in FIGURE 2. The valve plate cannot swing clockwise beyond the dotted line position of FIGURE 2 because of the engagement of its upper and lower edges with the wall of the tube. When in the dotted line or closed position, the outlet 32 of the tube is closed to prevent the flow of air.

It will be understood that the two ducts 26 are of exactly the same construction as shown in FIGURE 2, and have in common every detail of construction already described. The tubes 28 extend generally horizontally although sloping downward and in a rearward direction somewhat as shown in FIGURES 1 and 2. The outlet ends 32 of the tubes 28 are cut so as to lie in a vertical plane. The space beneath the panels 16, 18 and 20 is entirely open to the ambient air so that air withdrawn from the passenger compartment through the ducts 26 passes directly into the atmosphere.

When the vehicle is in forward motion and the doors and windows are closed to effectively seal the passenger space, the air pressure in the space tends to increase over that of the outside air. This may be due simply to the motion of the vehicle or to the operation of conventional heating or air conditioning equipment. Most persons will have experienced this increase in pressure within the passenger compartment as evidenced by the fact that when a window is partly opened at high speeds there is a considerable rush or flow of air out of the passenger compartment which will sometimes produce quite a bit of noise. According to my invention, however, air in the passenger space will continuously flow to the outside atmosphere through the ducts 26. The pressure differential, that is the excess of pressure within the passenger space over the pressure of the ambient air at the outlets 32 of the ducts, will create an outward flow through the ducts. This pressure differential is sufficient to open the valve plates 36 to the solid line position of FIGURE 2. There will also be a venturi effect due to the rush of ambient air across the rearwardly facing generally upright outlet opening 32 which results in a somewhat less than atmospheric pressure existing across the outlet 32, tending to suck the air out of the passenger compartment. There will be little if any tendency, under any circumstances, for the flow to reverse, that is for the ambient air to enter the passenger compartment through the ducts. Nevertheless, the valve 36 is provided for this purpose and will automatically close if ever the pressure of the ambient air at the outlets 32 should exceed the pressure in the passenger compartment.

The ducts 26 are located so that even the difficult to heat space between the front and back seats of the vehicle will have heat drawn to it immediately from the heater, due to the exhaust of air from this region.

At certain times it may be desirable to retain the valve plates 36 in the closed dotted line position of FIGURE 2, even though the differential pressure would otherwise tend to open them. As shown in FIGURES 2 and 4, a push-pull wire 42 slides in a bracket 43 on the side of one of the tubes 28, and has a right angle terminal portion 44 extending across the end of the tube beneath the pivot 38. The wire extends to the dashboard 45 where there is a control knob 46, by means of which the wire can be pushed to the inoperative dotted line position of FIGURE 4 (shown in full lines in FIGURE 2), or pulled to the solid line position of FIGURE 4. The solid line position of FIGURE 4 is the operative position in which the terminal portion 44 of the wire engages the valve plate 36 below pivot 38 to hold the valve plate closed. It will be understood that a similar push-pull wire is associated with the valve plate of the other tube 28 which may be controlled by the same knob 46 or by a separate knob likewise mounted on the dashboard.

FIGURES 5 and 6 show a modification of the invention which like parts are identified by the same reference characters. According to this embodiment, the air in the passenger space is withdrawn into the trunk compartment 50 through an outlet 52. The outlet 52 is provided in an opening in the generally horizontal panel 24 which provides a shelf for packages in back of the rest 22 of the rear seat. The outlet 52 is permanently or removably secured in any desired manner to the package shelf and has a screened opening 54. An outlet 56 is provided in the rear upright wall 58 of the trunk space. The outlet 56 is itself generally upright and faces rearwardly, and has a screened opening 60. Hence the air in the passenger compartment passes therefrom through the outlet 52 in package shelf 24 into the forward portion of the trunk space, and from there the withdrawn air passes into the atmosphere through outlet 56 in the rear wall of the trunk compartment.

The flow of air from the passenger compartment and ultimately into the atmosphere is created by the excessive pressure normally present in the closed passenger space of a moving vehicle. The rearwardly facing, generally upright outlet 56 also is subjected to a venturi effect, and the resulting reduced pressure or partial vacuum immediately to the rear of the outlet 56 helps in drawing the air from the passenger compartment.

Another outlet 62 is shown in dotted lines in the side upright wall of the trunk compartment. This outlet 62 is exactly like the outlet 56. Actually only one or the other of the outlets 56 and 62 will ordinarily be provided. The outlets 56 and 62 are above the bumper level and hence there is no possibility whatever of a back flow of air into the passenger compartment. Hence no check valve is employed. Nevertheless, a check valve similar to the one shown in FIGURE 2 at 36, may be provided if desired which may or may not be controlled by a push-pull wire as also shown in FIGURE 2.

According to the present invention, considering both embodiments, obviously lower capacity heating and air conditioning equipment will achieve the same and even better results when employed with my ventilating system. Air is evacuated in a controlled manner so that the heated or cooled air entering the passenger space from the equipment will much more quickly fill the passenger space and replace it with air at the desired temperature. Moreover, the pressure of air within the passenger space is prevented from becoming too high so that the equipment does not have to operate against high pressure. By evacuating air from selected points near the rear and otherwise hard to reach parts of the passenger space, the passenger space can be more uniformly heated or cooled. The constantly changing air will of course remove odors and smoke and the like so that the air is always clean and fresh. Window ventilation with its attendant disagreeable drafts and noise is altogether unnecessary.

What I claim as my invention is:

1. In a vehicle having a closed body defining a space for passengers, said body including a passenger-space-defining panel separating said space from the area directly beneath the body; means for withdrawing air from the passenger space including a duct, said duct comprising an elongated tube disposed longitudinally of the vehicle and mounted on said panel, the inlet end of said tube communicating with said passenger space through said panel, said tube extending rearwardly from its inlet end to its outlet end, said outlet end being on the exterior of and beneath the vehicle body, a valve for said tube adapted to prevent the flow of ambient air into the passenger space, said valve being in the form of a plate extending across said outlet end and hinged thereto on a horizontal axis above its center of gravity so that it tends to swing to closed position, said valve plate being free to open by rotation in one direction in response to an excess of pressure within the passenger space, and means for preventing said valve plate from opening by rotation in the opposite direction in response to an excess of pressure of the ambient air, the exterior of said tube from said panel rearwardly to its outlet end being laterally unconfined so as to be accessible to the ambient air whereby the ambient air produces a venturi effect on the outlet end of said tube when the vehicle is in forward motion.

2. In a vehicle having a closed body defining a space for passengers, said body including a transversely extending, generally upright, passenger-space-defining panel separating said space from the area directly beneath said body, the front side of said panel being within said space and the rear side of said panel being outside said space, and a rear seat within said space directly above said panel; means for withdrawing air from the passenger space including a duct, said duct comprising an elongated, straight, generally horizontal tube disposed longitudinally of the vehicle, the inlet end of said tube being mounted in and extending through an opening in said panel, said tube having an annular radially outwardly extending flange at its inlet end upon the front side of said panel, said tube extending rearwardly from its inlet end to its outlet end, a screen over said inlet end, said entire tube rearwardly of its inlet end being on the exterior of and beneath the vehicle body, said outlet end being disposed in a generally vertical plane, a valve for said tube adapted to prevent the flow of ambient air into the passenger space, said valve being in the form of a plate extending across said outlet end, said plate being hinged to said outlet end by a horizontal pin extending across said outlet end between the upper and lower edges thereof, said pin being connected to said plate at a point between the upper and lower edges above the center of gravity of said plate so that said plate tends to swing by gravity to a vertical closed position, said valve plate being free to open by rotation in on direction in response to an excess of pressure within the passenger space, said tube having means for preventing said valve plate from opening by rotation in the opposite direction in response to an excess of pressure of the ambient air, the exterior of said tube tapering toward the outlet end of said tube and being laterally unconfined rearwardly from said panel throughout the length of said tube so as to be accessible to the ambient air whereby the ambient air produces a venturi effect on said tube when the vehicle is in forward motion.

(References on following page)

References Cited by the Examiner

UNITED STATES PATENTS

| | | | |
|---|---|---|---|
| 2,203,477 | 6/1940 | Wahlberg | 98—2.4 |
| 2,241,755 | 5/1941 | Zaccone | 98—2 |
| 2,248,329 | 7/1941 | Bell | 98—2 |
| 2,631,518 | 3/1953 | Brandenburg | 98—2 |
| 2,750,864 | 6/1956 | Maki | 98—2 |
| 2,849,941 | 9/1958 | Negoro | 98—2 |

MEYER PERLIN, *Primary Examiner.*

ROBERT A. O'LEARY, *Examiner.*